(12) United States Patent
Riedel, Jr. et al.

(10) Patent No.: US 11,702,918 B2
(45) Date of Patent: Jul. 18, 2023

(54) MODULAR FRACTURING SYSTEM WITH SINGLE SIDE INLETS

(71) Applicant: SPM Oil & Gas Inc., Fort Worth, TX (US)

(72) Inventors: Robert E. Riedel, Jr., Wake Forest, NC (US); Peter A. Manos, McHenry, IL (US)

(73) Assignee: SPM Oil & Gas Inc., Fort Worth, TX (US)

( * ) Notice: Subject to any disclaimer, the term of this patent is extended or adjusted under 35 U.S.C. 154(b) by 0 days.

(21) Appl. No.: 17/538,819

(22) Filed: Nov. 30, 2021

(65) Prior Publication Data

US 2023/0167727 A1 Jun. 1, 2023

(51) Int. Cl.
*E21B 43/26* (2006.01)
*E21B 33/068* (2006.01)
*F16L 27/12* (2006.01)

(52) U.S. Cl.
CPC ........ *E21B 43/2607* (2020.05); *E21B 33/068* (2013.01); *E21B 43/26* (2013.01); *F16L 27/12751* (2019.08)

(58) Field of Classification Search
CPC .... E21B 43/2607; E21B 33/068; E21B 43/26; F16L 27/12751
See application file for complete search history.

(56) References Cited

U.S. PATENT DOCUMENTS

| | | | |
|---|---|---|---|
| 10,662,749 B1 * | 5/2020 | Hill | F16L 41/021 |
| 10,890,297 B2 | 1/2021 | Scott et al. | |
| 2012/0181013 A1 * | 7/2012 | Kajaria | E21B 43/26 166/79.1 |
| 2015/0184491 A1 * | 7/2015 | Kajaria | E21B 43/2607 29/428 |
| 2019/0383125 A1 * | 12/2019 | Koricanek | E21B 43/26 |
| 2020/0325893 A1 * | 10/2020 | Kraige | E21B 33/068 |
| 2021/0388931 A1 * | 12/2021 | George | F04C 28/02 |

FOREIGN PATENT DOCUMENTS

CN 105221130 A 1/2016

* cited by examiner

*Primary Examiner* — James G Sayre
(74) *Attorney, Agent, or Firm* — Lee & Hayes, P.C.

(57) ABSTRACT

A fracturing manifold system includes a first manifold assembly in a side-by-side arrangement with a second manifold assembly. The first manifold assembly includes a plurality of first junctions, each having multiple inlet ports facing a first side of the fracturing manifold system. The second manifold assembly includes a plurality of second junction, each having multiple inlet ports facing a second side of the fracturing manifold assembly. Inlet ports on a single junction may be angled relative to each. The inlet ports may also be angled relative to a manifold flow path.

20 Claims, 3 Drawing Sheets

MODULAR FRACTURING SYSTEM WITH SINGLE SIDE INLETS

TECHNICAL FIELD

The present disclosure relates to a hydraulic fracturing manifold. More specifically, the present disclosure relates to modular hydraulic fracturing manifolds that are configurable between multiple configurations.

BACKGROUND

Hydraulic fracturing is a well stimulation technique that typically involves pumping hydraulic fracturing fluid into a wellbore at a rate and pressure sufficient to form fractures in a rock formation surrounding the wellbore. This well stimulation technique often enhances the natural fracturing of a rock formation in order to increase the permeability of the rock formation, thereby improving recovery of water, oil, natural gas, and/or other fluids. In order to fracture such rock formations, the hydraulic fracturing fluid is injected into the wellbore at pressures and rates sufficient to exceed a fracture gradient of the target formation. In some conventional arrangements, a series of pumps is used to pressurize the hydraulic fracturing fluid. A fracturing manifold receives the pressurized hydraulic fracturing fluid from the pumps and delivers the hydraulic fracturing fluid to an injection point (e.g., a frac tree) at the necessary pump rate.

In order to reduce setup and teardown times, fracturing manifolds are often transported between jobsites on trailers. However, trailers are limited by structural size and weight restrictions and by local government restrictions. Furthermore, current fracturing manifold trailers lack modularity in the number of junctions provided and the location of a fracturing head in a fracturing manifold system.

An example hydraulic fracturing manifold is described in U.S. Pat. No. 10,662,749 (hereinafter referred to as "the '749 reference"). In particular, the '749 reference describes a trailer-mounted hydraulic fracturing manifold. The trailer-mounted fracturing manifold includes a specific number of cross junctions that are mounted on the trailer and receive fracturing fluid from fracturing pumps. More specifically, the cross-junctions include two ports, spaced 180-degrees relative to each other on opposite sides, to receive fracturing fluid from two fracturing pumps on opposite sides of the manifold. The '749 reference further describes a modular manifold (or secondary manifold) that may be coupled to the trailer mounted fracturing manifold in order to provide additional cross junctions, e.g., to increase an overall flow rate of the fracturing manifold. As a result, the system of the '749 reference, like other conventional applications, has a large footprint, including the trailer and the secondary manifold along a length and a width including pumps on either side of the manifold, along the length of the manifold.

Example embodiments of the present disclosure are directed toward overcoming the deficiencies described above, including by providing a more compact manifold that is more readily configurable for different applications.

SUMMARY

An example fracturing manifold includes a junction, a first inlet port, and a second inlet port. The junction includes a junction body defining a volume extending generally along a manifold axis of the fracturing manifold between an upstream opening and a downstream opening. The first inlet port extends from the junction body and defines a first inlet bore extending along a first inlet port axis from a first coupling configured to couple to a first source of high-pressure fracturing fluid to the volume. The second inlet port extends from the junction body and defines a second inlet bore extending along a second inlet port axis from a second coupling configured to couple to a second source of high-pressure fracturing fluid to the volume. the first inlet port extends from the junction body such that the first inlet port axis is angled, by a first angle, above a horizontal plane passing through the manifold axis. The second inlet port extends from the junction body such that the second inlet port axis is angled, by a second angle, below the horizontal plane.

An example fracturing system fracturing system includes a first fracturing manifold and a second fracturing manifold. The first fracturing manifold includes a plurality of first junctions aligned along a first manifold axis, wherein a first junction of the plurality of first junctions comprises a first inlet port extending from the first junction at least partially toward a first side of the first fracturing manifold, and a second inlet port extending from the first junction at least partially toward the first side of the first fracturing manifold, the first fracturing manifold further comprising a second side of the first fracturing manifold opposite the first side of the first fracturing manifold. The second fracturing manifold includes a plurality of second junctions aligned along a second manifold axis, wherein a second junction of the plurality of second junctions comprises a third inlet port extending from the second junction at least partially toward a first side of the second fracturing manifold, and a fourth inlet port extending from the second junction at least partially toward the first side of the second junction, the second fracturing manifold further comprising a second side of the second fracturing manifold opposite the first side of the second fracturing manifold. The first fracturing manifold and the second fracturing manifold are disposed such that the second side of the first fracturing manifold faces the second side of the second fracturing manifold.

In a further example, a junction for use in a fracturing system includes a junction body, a first inlet port, and a second inlet port. The junction body defines a volume extending between a first bore and a second bore, the first bore, the second bore, and the volume defining an axial flow path along an axis. The first inlet port extends from the junction body toward a lateral side of the junction, the first inlet port extending, along a first inlet port axis, to a first coupling configured to couple to a first source of high-pressure fracturing fluid to the volume. The second inlet port extends from the junction body toward the lateral side of the junction, the second inlet port extending, along a second inlet port axis, to a second coupling configured to couple to a second source of high-pressure fracturing fluid.

DETAILED DESCRIPTION

This disclosure generally relates to improvements in hydraulic fracturing systems, including improved modular hydraulic fracturing manifolds and components thereof. Although examples of this disclosure are directed to hydraulic fracturing systems and are shown with reference to specific components and arrangement, concepts described herein may be applicable to other components and/or arrangements; the disclosure is not limited to the specific manifold assemblies or systems described/disclosed. Wherever possible, the same reference numbers will be used through the drawings to refer to the same or like features.

Figure 1:
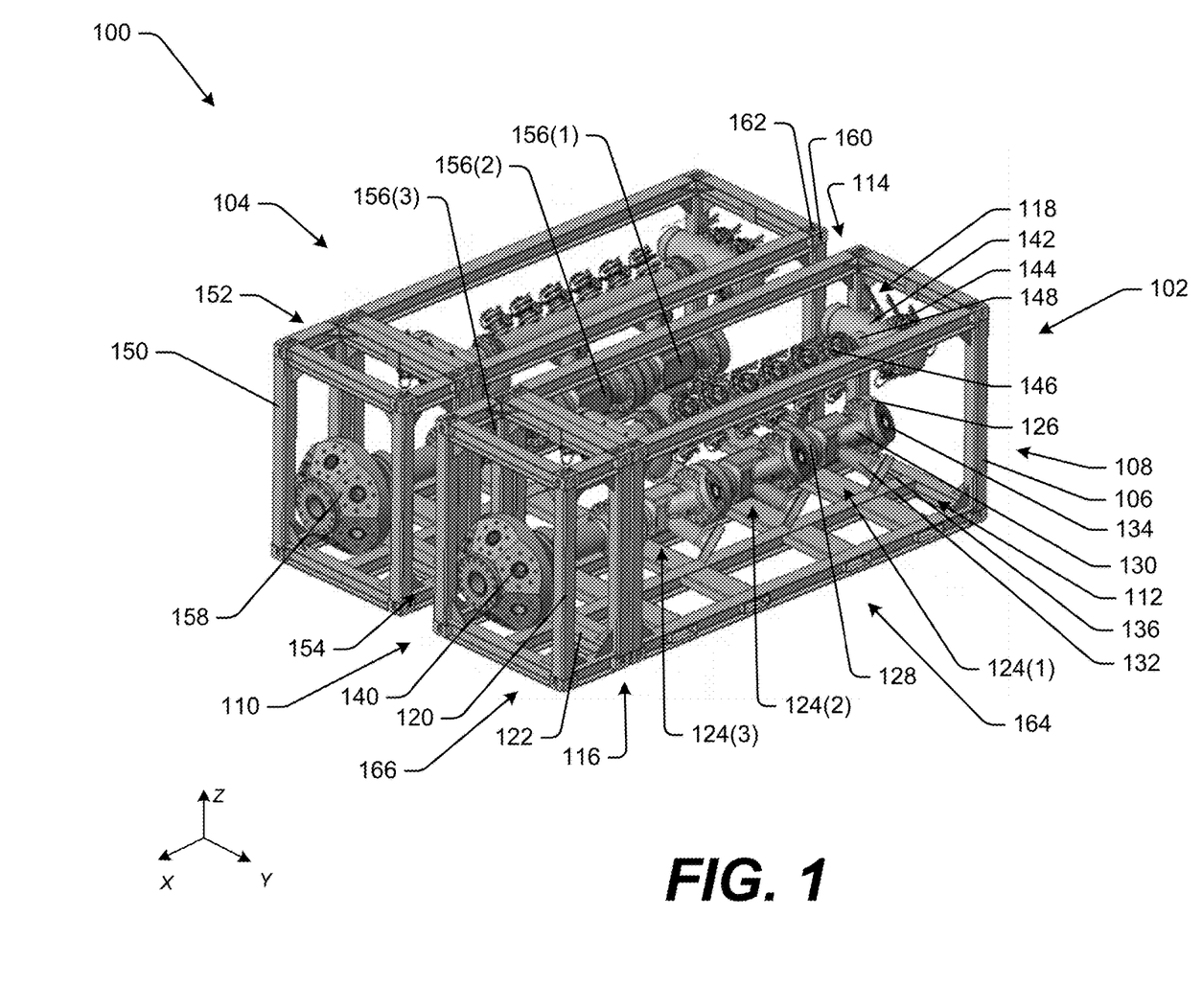
FIG. 1 is a perspective view of a hydraulic fracturing system, in accordance with an example of the present disclosure.

FIG. 1 depicts a perspective view of an example hydraulic fracturing system 100. For example, the hydraulic fracturing system 100 may be disposed at a hydraulic fracturing site. As will be appreciated, the hydraulic fracturing site will also include additional equipment that is used, along with the hydraulic fracturing system 100, during a hydraulic fracturing process. While FIG. 1 depicts some such equipment, it is to be understood that additional equipment will be necessary to conduct the hydraulic fracturing process. That additional equipment is omitted from FIG. 1 for clarity. Furthermore, certain equipment shown in FIG. 1 may be omitted in some hydraulic fracturing systems.

As mentioned previously, hydraulic fracturing is a well-stimulation technique that requires high-pressure injection of fracturing fluid into a well and corresponding wellbore in order to hydraulically fracture a rock formation surrounding the wellbore. While the description provided herein describes hydraulic fracturing in the context of wellbore stimulation for oil and gas production, it is to be understood that other uses of hydraulic fracturing are contemplated herein. For example, the hydraulic fracturing system 100 described herein may be used to stimulate groundwater wells, to dispose of waste by injection, to measure stress in the ground, to precondition and/or induce cave-ins for mining, to improve electrical generation in geothermal systems, or the like.

The hydraulic fracturing system 100 includes a first manifold assembly 102 and a second manifold assembly 104. More specifically, the first manifold assembly 102 comprises a first fracturing manifold, and the second manifold assembly 104 comprises a second fracturing manifold. Although not shown in FIG. 1, the first manifold assembly 102 and the second manifold assembly 104 may be disposed on a mounting surface. In some examples, the mounting surface may be surface of a trailer, a truck bed, or some other movable apparatus. In other examples, the mounting surface may be stationary or fixed.

The first manifold assembly 102 generally includes a manifold frame 106 defining physical extents of the first manifold assembly 102. For example, the manifold frame 106 defines a first end 108 and a second end 110 spaced in a longitudinal direction from first end 108. The manifold frame 106 also defines a first lateral side 112 and a second lateral side 114 spaced from the first lateral side 112. The manifold frame 106 also defines a bottom 116 and a top 118 of the first manifold assembly 102. In the illustrated example, the manifold frame 106 defines a cuboid shape, and generally includes a plurality of vertically-oriented members 120 and horizontally-oriented members 122 (collectively, "the members 120, 122"). A number of the members 120, 122 are illustrated for example only; other configurations for the manifold frame 106 also are contemplated. Without limitation, the manifold frame 106 may include more or fewer of the members 120, 122 than those disclosed, the manifold frame 106 may include differently-oriented members, e.g., angled members, or the like. Moreover, in some implementations, the manifold frame 106 may be other than cuboid shaped.

The manifold frame 106 may provide for ease of handling of the first manifold assembly 102. For instance, instances of the horizontal members 122 forming the top 118 of the first manifold assembly 102 and/or the bottom 116 of the first manifold assembly 102 may be engaged by a hoist, forks of a fork truck, or the like, to facilitate movement of the first manifold assembly between locations and/or placement of the first manifold assembly 102 at a desired position. In other instances, the manifold frame 106 can incorporate one or more of lift bolts, handles, or other features to facilitate movement. The manifold frame 106 may also facilitate coupling of the first manifold assembly 102 to a mounting surface. For example, and although not shown in FIG. 1, mounting holes may be provided through one or more of the horizontal members forming the bottom 116 of the manifold frame 106. In this example, mounting bolts or the like may pass through the mounting holes and be selectively coupled to a mounting surface, e.g., to fix the first manifold assembly 102 to the mounting surface.

The manifold frame 106 is also configured to support components of the first manifold assembly 102. Specifically, the manifold frame 106 may act as a housing for a plurality of junctions 124, including a first junction 124(1), a second junction 124(2), and a third junction 124(3). Although the example of FIG. 1 illustrates the first manifold assembly 102 as including three instances of the junctions 124, in other implementations of this disclosure, more or fewer of the junctions 124 may be provided. Moreover, the example of FIG. 1 omits mounting structures that couple or secure the junctions 124 and/or other components of the second manifold assembly 104 relative to the manifold frame 106. In aspects of this disclosure, any mounting structures that maintain the junctions 124 in a functional position may be used.

In the example of FIG. 1, the junctions 124 are arranged in series. For instance, each of the junctions 124 may include a first end 126, which may be an upstream end, and second end 128, which may be a downstream end. As illustrated, second end 128 of the first junction 124 (1) is coupled directly to the first end 126 of the second junction 124 (2). Similarly, the second end 128 of the second junction 124 (2) is coupled directly to the first end 126 of the third junction 124 (3). In the illustrated example, the ends 126, 128 are provided with cooperating flanges that facilitate the above-described direct coupling. In other instances, however, coupling arrangements other than the flanged ends may be used, as will be appreciated by those having ordinary skill in the art with the benefit of this disclosure. Moreover, although the junctions 124 are illustrated as being directly connected to adjacent junctions 124, in other instances, a conduit, such as a rigid conduit, may be provided between instances of the junctions 124. Such rigid conduits may provide spacing between the junctions 124, which may be desirable in some instances. However, in the illustrated embodiment, the direct connection of the junctions 124 proximate the ends 126, 128 results in a reduced footprint (compared to a footprint including the rigid conduits) by reducing an overall length (in the X-direction) of the first manifold assembly 102.

The junctions 124 are configured to receive pressurized fluid via one or more fluid inputs. Specifically, the first junction 124(1) is illustrated as including a first inlet port 130 and a second inlet port 132. The first inlet port 130 and the second inlet port 132 are configured to couple to a source of pressurized fluid, e.g., via one or more conduits, flowlines, or the like. Without limitation, the junctions 124 may receive high-pressure fracturing fluid from one or more pumps (not shown) via the first inlet port 130 and the second inlet port 132. In FIG. 1, the first inlet port 130 terminates at a first flanged coupler 134, and the second inlet port 132 terminates at a second flanged coupler 136. The flanged couplers 134, 136 may facilitate attachment of a flowline having a corresponding flanged coupler, as is generally known in the art. However, the first and second inlet ports 130, 132, are not limited having the flanged couplers 134, 136, respectively. Other coupling arrangements are known and can also be used in implementations of this disclosure. For ease of illustration and clarity, only components of the first junction 124(1) are labelled in FIG. 1, although it will be appreciated that, in implementations of this disclosure, each of the junctions 124 may be substantially identical.

As stated above, the junctions 124 in the first manifold assembly 102 are arranged in series. Accordingly, high-pressure fluid entering the junctions 124, e.g., via the inlet ports 130, 132 will pass through the first manifold assembly 102, in a direction from the first junction 124(1), through the second junction 124(2), and through the third junction 124(3). Upon exiting the third junction 124 (3), e.g., via the second end 128 thereof, the high-pressure fluid passes through a rigid conduit 138 to a fracturing head 140. The fracturing head 140, which is often referred to as a "goat head," receives fracturing fluid from the junctions 124 and delivers the fracturing fluid to a well (via a wellhead mounted on the well) during a hydraulic fracturing process. In some examples, the fracturing head 140 may be fluidly connected to multiple wells. During a hydraulic fracturing process, the wells may include frac trees that are installed on individual wells.

The first manifold assembly 102 also includes components associated with low-pressure fluid flow. For example, and as is generally conventional in the art, low-pressure fluid from a blender (not shown) is pressurized by pumps, which pressurize the fluid as high-pressure fluid supplied to the junctions 124. As illustrated in FIG. 1, the first manifold assembly 102 includes, as part of a low-pressure fluid system, a transverse pipe 142 and a plurality of inlet ports 144 associated with the transverse pipe 142. Moreover, a plurality of outlet ports 146 are disposed along an axial pipe 148.

According to the foregoing, the first manifold assembly 102 provides a modular manifold assembly that may be readily transported and/or positioned at a fracturing site. The modular manifold assembly may have a reduced footprint, e.g., relative to conventional trailer-mounted manifolds, while still being configured to facilitate coupling to a high-pressure fluid source, a low-pressure fluid source, and a well bore, e.g., to perform fracturing operations.

The second manifold assembly 104 is substantially the same as the first manifold assembly 102. Specifically, the second manifold assembly 104 includes substantially all the same components as the first manifold assembly 102, but is configured as a mirror-image of the first manifold assembly 102. Select components of the second manifold assembly 104 are labelled in FIG. 1 and described herein. However, for clarity of presentation, many components of the second manifold assembly 104 are not labelled in FIG. 1, and will not be discussed herein in detail. Such components have corresponding features in the first manifold assembly 102, which have already been discussed above and/or further below.

The second manifold assembly 104 includes a manifold frame 150. Like the manifold frame 106, the manifold frame 150 includes a number of horizontal and vertical members that defines extents of the second manifold assembly 104. Specifically, the manifold frame 150 defines a first lateral side 152 and an opposite, second lateral side 154. In the hydraulic fracturing system 100, the manifold frame 106 of the first manifold assembly 102 and the manifold frame 150 of the second manifold assembly 104 are arranged side-by-side, e.g. with the second lateral side 114 of the manifold frame 106 facing the second lateral side 154 of the manifold frame 150. Stated differently, the second lateral sides 114, 154 are inboard-facing sides and the first lateral sides 112, 152 are outboard-facing sides of the hydraulic fracturing system 100.

The second manifold assembly 104, like the first manifold assembly 102, supports a plurality of junctions 156, including a first junction 156(1), a second junction 156(2), and a third junction 156(3). Although three junctions are illustrated in FIG. 1, the second manifold assembly 104 may include more or fewer of the junctions 156. The junctions 156 may be identical to the junctions 124. For example, although obscured in FIG. 1, the junctions 156 may include first inlet ports and second inlet ports configured to couple to high-pressure fluid sources. The first inlet ports and the second inlet ports, like the first and second inlet ports 130, 132, generally extend toward the first lateral side 152, e.g., to couple to pumps disposed proximate the first lateral side 152. Like the junctions 124, the junctions 156 define a high-pressure flow path, e.g., from the first junction 156(1), through the second junction 156(2) and the third junction 156(3), to a fracturing head 158.

Accordingly, in the embodiment of FIG. 1, the junctions 124 define a first manifold flow path and the junctions 156 define a second manifold flow path, generally parallel to the first manifold flow path. The first and second flow paths are parallel, e.g., with each configured to stimulate a different well. Stated differently, the first manifold assembly 102 provides a first fracturing manifold that can be connected to up to six sources of high-pressure fluid, all from a single side of the first manifold assembly 102. Similarly, the second manifold assembly 104 provides a second fracturing manifold that can be connected to up to six (other) sources of high-pressure fluid, all from a single side of the second manifold assembly 104. The hydraulic fracturing system 100 is a compact system with a greatly reduced footprint, e.g., relative to conventional trailer-mounted fracturing manifolds and increased output.

In some examples, the first manifold assembly 102 and the second manifold assembly 104 may be independently secured, e.g., to a common horizontal mounting surface. For instance, in the example of FIG. 1, the first manifold assembly 102 and the second manifold assembly 104 are generally aligned side-by-side, but are spaced laterally from each other. In further examples, the manifold frames 106, 150 may include one or more coupling features to facilitate coupling of the first manifold assembly 102 to the second manifold assembly 104 in the side-by-side arrangement. FIG. 1 also illustrates example coupling features. More specifically, corners of the manifold frame 106 and the manifold frame 150 are selectively provided with male couplers 160 or female couplers 162. The male couplers 160 are generally formed as flanged protrusions and the female couplers 162 are formed as slots. The flanged protrusions and the slots are configured to provide for selective engagement of the flanged protrusion in the slot. In the example of FIG. 1, instances of the male couplers 160 and/or of the female couplers 162 are provided at corners of the manifold frame 106 on the second lateral side 114. Similarly, the manifold frame 150 of the second manifold assembly 104 includes cooperating instances of the female couplers 162 and/or of the male couplers 160 on corners of the second lateral side 154 of the manifold frame 150 of the second manifold assembly 104.

Figure 4:
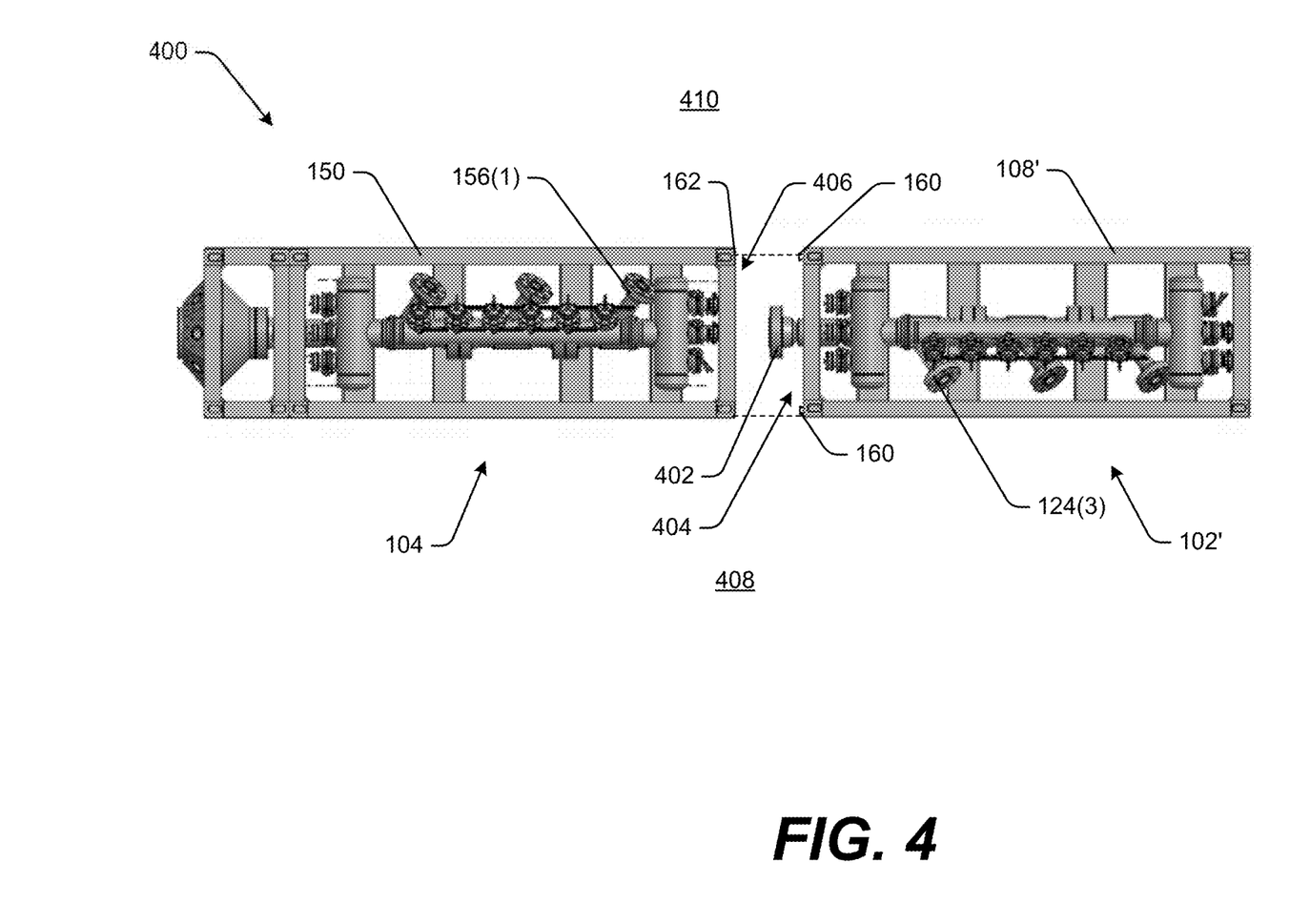
FIG. 4 is a top view of an example of an alternative configuration of the hydraulic fracturing system of FIG. 1, in accordance with an example of the present disclosure.

In addition to facilitating coupling of the first manifold assembly 102 to the second manifold assembly 104, the couplers 160, 162 may be useful to facilitate selective coupling of the manifold frames 106, 150 to other components and/or to facilitate coupling of portions of the manifold frames 106, 150. For instance, the top, bottom, sides, and ends of the manifold frames 106, 150 may be modular frames having a predetermined size, shape and/or other configuration. Other components for use in the fracturing system may include frames with a corresponding size/shape. The frames of those components, like the manifold frames 106, 150, will also include instances of the couplers 160, 162, e.g., at corners thereof. In the example of FIG. 1, for instance, the manifold frame 106 includes a first portion 164 supporting the junctions 124 and a second portion 166 containing the fracturing head 140. The first portion and the second portion are selectively secured to each other, e.g., via the male couplers 160 and the female couplers 162 at the corners, to facilitate connection of the junctions 124 with the fracturing head 140. The couplers 160, 162 may also facilitate configuring the hydraulic fracturing system 100 in other ways. An example of an alternative configuration is shown in FIG. 4, and detailed further below.

Figure 2:
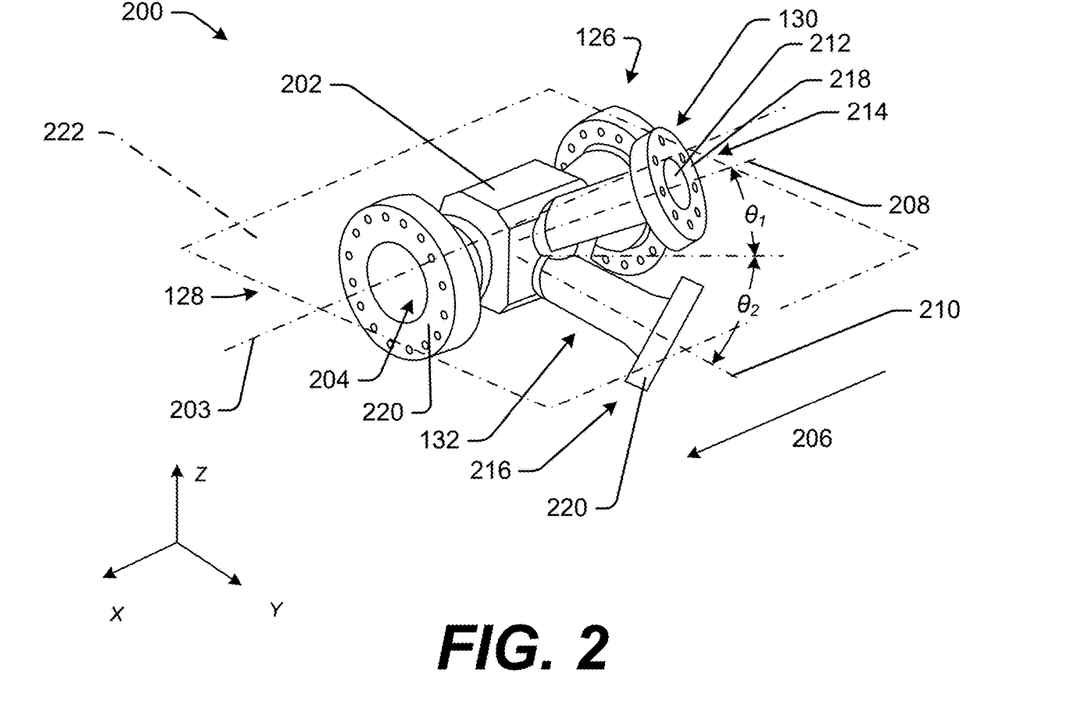
FIG. 2 is a perspective view of a junction for use in the hydraulic fracturing system of FIG. 1, in accordance with an example of the present disclosure.

FIG. 2 is a perspective view of a junction 200, which may be one of the junctions 124 or one of the junctions 156. The junction 200 includes a junction body 202 that extends generally between the first end 126 and the second end 128. The first end 126 defines a first axial bore (not visible in FIG. 2) and the second end 128 defines a second bore 204. The junction body 202 defines a volume in fluid communication with the first bore and the second bore 204. In examples, the first bore and the second bore may have a diameter of up to about seven inches or more. Accordingly, the first bore, the second bore 204, and the volume defined by the junction body 202 define a manifold flow path through which high-pressure fluid can pass, e.g., generally as described above. The manifold flow path is generally arranged along a manifold axis 203. For instance, the first end 126 may be an upstream end and the second end 128 may be a downstream end, such that high-pressure fluid passes through the junction 200 along an axial flow path generally in the direction of an arrow 206 in FIG. 2.

As also illustrated in FIG. 2, the junction 200 includes the first inlet port 130 and the second inlet port 132. More specifically, the first inlet port 130 extends from the junction body 202 along a first inlet port axis 208, and the second inlet port 132 extends from the junction body 202 along a second inlet port axis 210. More specifically, the first inlet port 130 defines a first inlet bore 212 extending generally along the first inlet port axis 208 from a distal end 214 of the first inlet port 130 to the volume defined by the junction body 202. The first inlet bore 212 generally defines a first inlet flow path, e.g., from the distal end 214 to the junction body 202. Although obscured in the view of FIG. 2, the second inlet port 132 defines a second inlet bore extending generally along the second inlet port axis 210 from a distal end 216 of the second inlet port 132 to the volume defined by the junction body 202. The second inlet bore generally defines a second inlet flow path, e.g., from the distal end 216 to the junction body 202. The distal end 214 of the first inlet port 130 includes a first flange 218 and the distal end 216 of the second inlet port 130 includes a second flange 220.

The first flange 218 may form a portion of a first coupling, and the second flange 220 may form a portion of a second coupling. As discussed above, the first inlet port 130 is configured to couple to a first source of high-pressure fluid, e.g., fracturing fluid, and the second inlet port 132 is configured to couple to a second source of high-pressure fluid. The flanges 218, 220, along with one or more additional features, may facilitate these couplings. Without limitation, FIG. 2 shows a plurality of holes formed through the first flange 218. These holes may cooperate with mounting bolts or similar fasteners to secure a flowline to the first flange 218 of the first inlet port 130. In other examples, the first inlet port 130 and/or the second inlet port 132 may include coupling features other than the flanged couplings. Many couplings are known for securing high-pressure flowlines, including but not limited to welded connections, threaded connections, hammer unions, or the like.

As noted above, the first inlet port 130 and the second inlet port 132 extend, at least partially, toward a first side of the manifold assembly in which they are incorporated. In the context of FIG. 2, the first inlet port 130 and the second inlet port 132 both extend, at least partially, in the illustrated y-direction. Stated differently, the first inlet port axis 208 and the second inlet port axis 210 extend at least partially in the y-direction relative to the manifold axis 203. Thus, unlike conventional junction arrangements that position inlet ports on opposite sides of a junction body, e.g., at generally horizontal positions spaced 180-degrees from each other about the junction body, the first and second inlet ports 130, 132 are on the same lateral side of the junction 200. Providing the first and second inlet ports 130, 132 on the same side of the junction 200 may provide a number of benefits. For instance, as shown in the example of FIG. 1, this arrangement of the inlet ports allows for the side-to-side arrangement of manifold assemblies including the junction 200, which reduces an overall footprint of a fracturing system.

In the illustrated example of FIG. 2, the first inlet port 130 is arranged generally above the second inlet port 132. Stated differently the first inlet port axis 208 is angled relative to the second inlet port axis 210 about the manifold axis 203. For example, the first inlet port 130 is disposed such that the first inlet port axis 208 is angled relative to (above) a horizontal plane 222 that is coincident with the manifold axis 203 by a first angle, $\theta_1$. The second inlet port 132 is disposed such that the second inlet port axis 210 is angled relative to (below) the horizontal plane 222 by a second angle, $\theta_2$. In the arrangement of FIG. 2, the first angle, $\theta_1$, and/or the second angle, $\theta_2$, may be acute angles, and more specifically may be from about 5-degrees to about 45-degrees. Accordingly, an angle between the first inlet port axis 208 and the second inlet port axis 210, e.g., the sum of $\theta_1$ and $\theta_2$, may be less than 180-degrees and in some instances equal to or less than about 90-degrees or less. The angles, $\theta_1$, $\theta_2$, are for example only. In some instances, the angles may be selected to provide adequate clearance between the first flange 218 and the second flange 220, e.g., to facilitate coupling of a flowline carrying high-pressure fluid. Moreover, although the first and second angles, $\theta_1$, $\theta_2$, are illustrated as substantially equal, such is not required.

Figure 3:
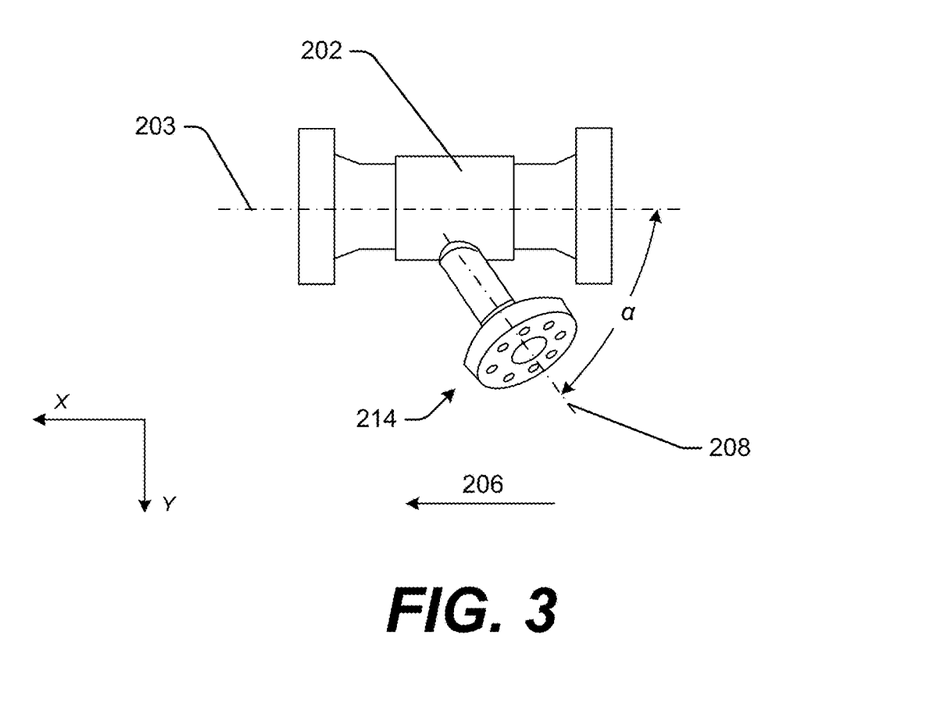
FIG. 3 is a top view of the junction of FIG. 2, in accordance with an example of the present disclosure.

The junction 200 receives high-pressure fluid, via the first inlet port 130 and the second inlet port 132. This fluid exits the junction body 202 generally along the manifold flow path discussed above. FIG. 3 illustrates that the first inlet port 130 and the second inlet port 132 may also be angled relative to the flow path. More specifically, FIG. 3 is a top view of the junction 200 showing that the first inlet port axis 208 is angled, e.g., in the X-Y or horizontal plane, from the manifold axis 203 by an angle, α. The second inlet port 132 is obscured in FIG. 3, because it is configured directly below the first inlet port 130. As will be appreciated, the second inlet port axis 210 of second inlet port 132 may also be angled, by the angle, α, relative to the manifold axis 203 in the X-Y plane. In examples, the angle, α, may be from about fifteen-degrees to about 75-degrees.

Angling the first inlet port 130 and the second inlet port 132 by the angle, α, as shown in FIG. 3 results in fluid flowing through the respective inlet ports 130, 132 to the junction body 202 to have a directional component that is aligned with flow through the junction body 202, e.g., along the direction shown by the arrow 206. More specifically, the inlet ports provide angled flow paths, generally along the inlet port axes 208, 210 that are at least partially aligned with the direction of fluid flow. This arrangement is unlike conventional arrangements in which inlet ports are substantially normal to the junction axis.

The arrangement of the of the first inlet port 130 and the second inlet port 132 is for example only; modifications are contemplated. For example, and without limitation, although the first inlet port 130 is shown as being disposed directly above the second inlet port 132, e.g., in the z-direction, this is not required. In other examples, the first inlet port 130 may be offset from the second inlet port 132, e.g. in the x-direction and/or the y-direction. For instance, the angle, α, may be different for the first inlet port axis 208 and the second inlet port axis 210. Moreover, although the first inlet port 130 is illustrated as extending a same distance from the junction body 202 as the second inlet port 132, in other examples, a distance from the junction body 202 (or the manifold axis 203) to the first flange 218 may be different than a distance from the junction body 202 (or the manifold axis 203) to the second flange 220. Other arrangements of the first inlet port 130 and the second inlet port 132 also will be apparent to those having ordinary skill in the art, with the benefit of this disclosure.

As noted above, the first inlet port 130 and the second inlet port 132 are configured to be connected, e.g., via a flowline, to a source of high-pressure fluid. The first inlet port 130 and the second inlet port 132 may be sized and/or configured based on the application. For instance, and without limitation, the first inlet port 130 and the second inlet port 132 may define bores having a diameter of at least about two inches. In some examples, the diameter of the first inlet port 130 and/or of the second inlet port 132 may be at least about three inches, four inches, or more. In examples, the bores defined by the first inlet port 130 and/or by the second inlet port 132 may be configured to align with a conventionally- or nominally-sized flowline, conduit, pipe, or the like.

As will be appreciated from the foregoing, the hydraulic fracturing system 100 described herein provides a robust system with a decreased footprint. For example, the hydraulic fracturing system 100 can receive high-pressure fluid from via a total of twelve instances of the inlet ports 130, 132 in a much smaller footprint than a conventional trailer-mounted manifold. As will be appreciated, the hydraulic fracturing system 100 mounts two junctions back-to-back, e.g., the first junction 124(1) and the first junction 156(1), to receive fluid from four sources, thereby effectively doubling flow rate and/or capacity relative to conventional systems. Moreover, the junctions 124, 156, 200 are sufficiently robust to work with higher-pressure pumps which may take up less space than conventional pumps.

As also discussed above in connection with FIG. 1, aspects of this disclosure provide for increased modularity. For instance, the manifold frames 106, 150, and the couplers 160, 162 associated therewith may facilitate configuring and re-configuring of the hydraulic fracturing system 100. FIG. 4 shows an example of an alternative configuration 400 of the hydraulic fracturing system 100.

FIG. 4 depicts an example arrangement that provides for increased flow rate, e.g., relative to the first manifold assembly 102 and the second manifold assembly 104. More specifically, the configuration 400 provides for an increased flow rate of the hydraulic fracturing system 100 by placing additional instances of the junctions 124, 156 in series. As illustrated, the configuration 400 includes the second manifold assembly 104 arranged in series with a modified first manifold assembly 102' having a modified manifold frame 108'. Specifically, the fracturing head 140, and a portion of the manifold frame 106 surrounding the fracturing head 140, are removed, such that the modified first manifold assembly 102' includes the junctions 124, but is free of the fracturing head 140. In examples, a portion of the manifold frame 106 supporting the fracturing head 140 may be a modular frame, including instances of the couplers 160, 162, to cooperate with corresponding instances of the couplers 160, 162 on the modified manifold frame 108'. Removal of the fracturing head 140 also exposes a flanged coupling 402, which is illustrated as extending beyond a first end 404 of the modified manifold frame 108'.

In the configuration 400, the first end 404 of the modified manifold frame 108' is configured to be coupled to an end 406 of the manifold frame 150 of the second manifold assembly 104. Specifically, the first end 404 of the modified first manifold assembly 102' is illustrated as including instances of the male couplers 160 and, although not visible in the orientation of FIG. 4, the end 406 of the second manifold assembly 104 includes cooperating instances of the female couplers 162. In the configuration 400, the third junction 124(3) is positioned to couple to the first junction 156(1) of the second manifold assembly 104, e.g., via the flanged coupling 402. As a result, the junctions 124, 156 are aligned in series, e.g., to transfer high-pressure fluid to the fracturing head 158.

In the example configuration 400, the first manifold assembly 102 is modified and coupled to the second manifold assembly 104. As a result, in the illustration, inlet ports associated with the junctions 124 generally extend toward a first side 408 of the configuration 400, whereas inlet ports associated with the junction 156 extend toward a second side 410, opposite the first side 408. However, this configuration is only to illustrate the modularity of the hydraulic fracturing system 100, e.g., that the components of the hydraulic fracturing system 100 can be repositioned based on the application. In other examples, the junctions 124 or the junctions 156 may be re-oriented, or replaced with alternative junctions, such that all instances of the inlet ports extend generally toward the first side 408 or toward the second side 410. As will be appreciated, aligning all inlet ports proximate a single side may facilitate attachment to high-pressure fluid supplies disposed on only a single side of the hydraulic fracturing system 100 in the configuration 400. Moreover, providing the inlet ports facing toward a single side may allow for mounting of another manifold assembly, e.g., in a side-to-side arrangement, as in FIG. 1. Stated differently, and with reference to FIG. 1, the first manifold assembly 102 and/or the second manifold may be extended to include more junctions, while maintaining the compact, side-by-side arrangement.

Although FIG. 4 shows one example alternative configuration, the modularity of the hydraulic fracturing system 100, e.g., resulting from the manifold frames 106, 150 and the couplers 160, 162, may allow for myriad configurations, as will be appreciated by those having ordinary skill in the art. For example, and without limitation, in an alternative configuration, the manifold frames 106, 150 may be stacked vertically, e.g., with the manifold frame 106 on top of the frame 150 or the manifold frame 150 on top of the manifold frame 106. For example, and with reference to FIGS. 1, tops of the corners of the manifold frames 106, 150 (or tops of the corners of the modified manifold frame 108' in FIG. 4) can include instances of the couplers 160, 162. Although not visible in FIG. 1 or in FIG. 4, corresponding instances of the couplers 160, 162, may be formed on the bottoms of the corners of the manifold frames 106, 150. As will be appreciated, in this alternative example, the junctions 124, 158 may still form parallel flow paths, as in the hydraulic fracturing system 100 discussed above.

INDUSTRIAL APPLICABILITY

The present disclosure describes a hydraulic fracturing system 100 (or other fluid pump system) that includes multiple manifold assemblies 102, 104. The hydraulic fracturing system 100 described herein provides for improved modularity of fracturing components, e.g., for increased flexibility at a fracturing site.

Because of this modularity, the manifold assemblies 102, 104 described herein provide a number of benefits. For instance, this modularity increases a greater range of flow rates that the hydraulic fracturing system 100 provides during hydraulic fracturing (or other pump processes). Furthermore, by placing the inlet ports 130, 132 on the same side of the manifold assembly 102, the hydraulic fracturing system 100 decreases the overall footprint and weight of the hydraulic fracturing system 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A fracturing manifold comprising:
a junction including a junction body defining a volume extending generally along a manifold axis of the fracturing manifold between an upstream opening and a downstream opening;
a first inlet port extending from the junction body, the first inlet port defining a first inlet bore extending along a first inlet port axis from a first coupling configured to couple to a first source of high-pressure fracturing fluid to the volume; and
a second inlet port extending from the junction body, the second inlet port defining a second inlet bore extending along a second inlet port axis from a second coupling configured to couple to a second source of high-pressure fracturing fluid to the volume,
wherein the first inlet port extends from the junction body such that the first inlet port axis is angled, by a first angle, above a horizontal plane passing through the manifold axis
wherein the second inlet port extends from the junction body such that the second inlet port axis is angled, by a second angle, below the horizontal plane, and
wherein the junction body has the first inlet port and the second inlet port located on a first lateral side without additional inlet ports on a second lateral side opposite of the first lateral side.

2. The fracturing manifold of claim 1, wherein the first inlet port axis and the second inlet port axis are spaced relative to each other by an angle, about the manifold axis, of less than 180-degrees.

3. The fracturing manifold of claim 2, wherein the angle is less than about 90-degrees.

4. The fracturing manifold of claim 1, wherein the first inlet port axis is angled relative to the manifold axis by an angle of between about fifteen-degrees and about 75-degrees.

5. The fracturing manifold of claim 4, wherein:
the junction body defines a manifold flow path extending generally along the manifold axis from the upstream opening to the downstream opening;
the first inlet bore defines a first inlet flow path, generally along the first inlet port axis, from the first coupling to the volume; and
the first inlet port is disposed such that the first inlet flow path has a directional component, in a direction parallel to the manifold axis, that is aligned with the manifold flow path.

6. The fracturing manifold of claim 1, wherein: the first inlet bore and the second inlet bore have a diameter of about 2 inches or greater.

7. A junction for use in a fracturing manifold, the junction comprising:
a junction body defining a volume extending between a first bore and a second bore, the first bore, the second bore, and the volume defining an axial flow path along an axis;
a first inlet port extending from the junction body toward a first lateral side of the junction, the first inlet port extending, along a first inlet port axis, to a first coupling configured to couple to a first source of high-pressure fracturing fluid to the volume; and
a second inlet port extending from the junction body toward the first lateral side of the junction, the second inlet port extending, along a second inlet port axis, to a second coupling configured to couple to a second source of high-pressure fracturing fluid,
wherein the junction body has the first inlet port and the second inlet port located on the first lateral side without additional inlet ports on a second lateral side opposite of the first lateral side.

8. The junction of claim 7, wherein:
the first inlet port extends from the junction body such that the first inlet port axis is angled, by a first angle, above a horizontal plane coincident with the axis, and
wherein the second inlet port extends from the junction body such that the second inlet port axis is, by a second angle, below the horizontal plane.

9. The junction of claim 8, wherein the first angle is between about 1-degree and about 45-degrees and the second angle is between about 1-degree and about 45-degrees.

10. The junction of claim 7, wherein the first inlet port axis is spaced from the second inlet port axis by an angle of about 90-degrees or less about the axis.

11. The junction of claim 7, wherein the first inlet port axis is angled relative to the axis, in a horizontal plane coincident with the axis, by an angle of between about fifteen-degrees and about 75-degrees such that a component of a first inlet flow path is generally in a direction of the axial flow path.

12. A manifold assembly comprising:
a fracturing manifold including a plurality of junctions aligned along a manifold axis of the fracturing manifold, wherein each junction, of the plurality of junctions, comprises:
a junction body defining a volume extending along the manifold axis between an upstream opening and a downstream opening of the junction body,
a first inlet port extending from the junction body, the first inlet port defining a first inlet bore extending along a first inlet port axis from a first coupling configured to couple to a first source of high-pressure fracturing fluid to the volume, and
a second inlet port extending from the junction body, the second inlet port defining a second inlet bore extending along a second inlet port axis from a second coupling configured to couple to a second source of high-pressure fracturing fluid to the volume; and
a manifold frame supporting the plurality of first junctions, the manifold frame defining:
a first end and a second end spaced in a longitudinal direction from first end,
a first lateral side and a second lateral side, the second lateral side spaced from, and opposite of, the first lateral side,
a bottom, and
a top,
wherein the first inlet ports and the second inlet ports are disposed on the first lateral side without additional inlet ports on the second lateral side.

13. The manifold assembly of claim 12, wherein:
the first inlet port extends from the junction body and the first inlet port axis is angled, by a first angle, above a horizontal plane passing through the manifold axis, and
the second inlet port extends from the junction body and the second inlet port axis is angled, by a second angle, below the horizontal plane.

14. The manifold assembly of claim 13, wherein the first inlet port axis and the second inlet port axis are spaced relative to each other by an angle, about the manifold axis, of less than 180-degrees.

15. The manifold assembly of claim 14, wherein the angle is less than about 90-degrees.

16. The manifold assembly of claim 12, wherein the first inlet port axis is angled relative to the manifold axis by an angle of between about fifteen-degrees and about 75-degrees.

17. The manifold assembly of claim 16, wherein:
the junction body defines a manifold flow path extending generally along the manifold axis from the upstream opening to the downstream opening;
the first inlet bore defines a first inlet flow path, generally along the first inlet port axis, from the first coupling to the volume; and
the first inlet flow path has a directional component, in a direction parallel to the manifold axis, that is aligned with the manifold flow path.

18. The manifold assembly of claim 12, wherein the manifold assembly is attachable to a mounting surface.

19. The manifold assembly of claim 18, wherein the manifold frame is configured to facilitate attachment to the mounting surface.

20. The manifold assembly of claim 12, wherein the manifold assembly is a first manifold assembly configured to be coupled to a second manifold assembly.

* * * * *